United States Patent Office 3,348,681
Patented Oct. 24, 1967

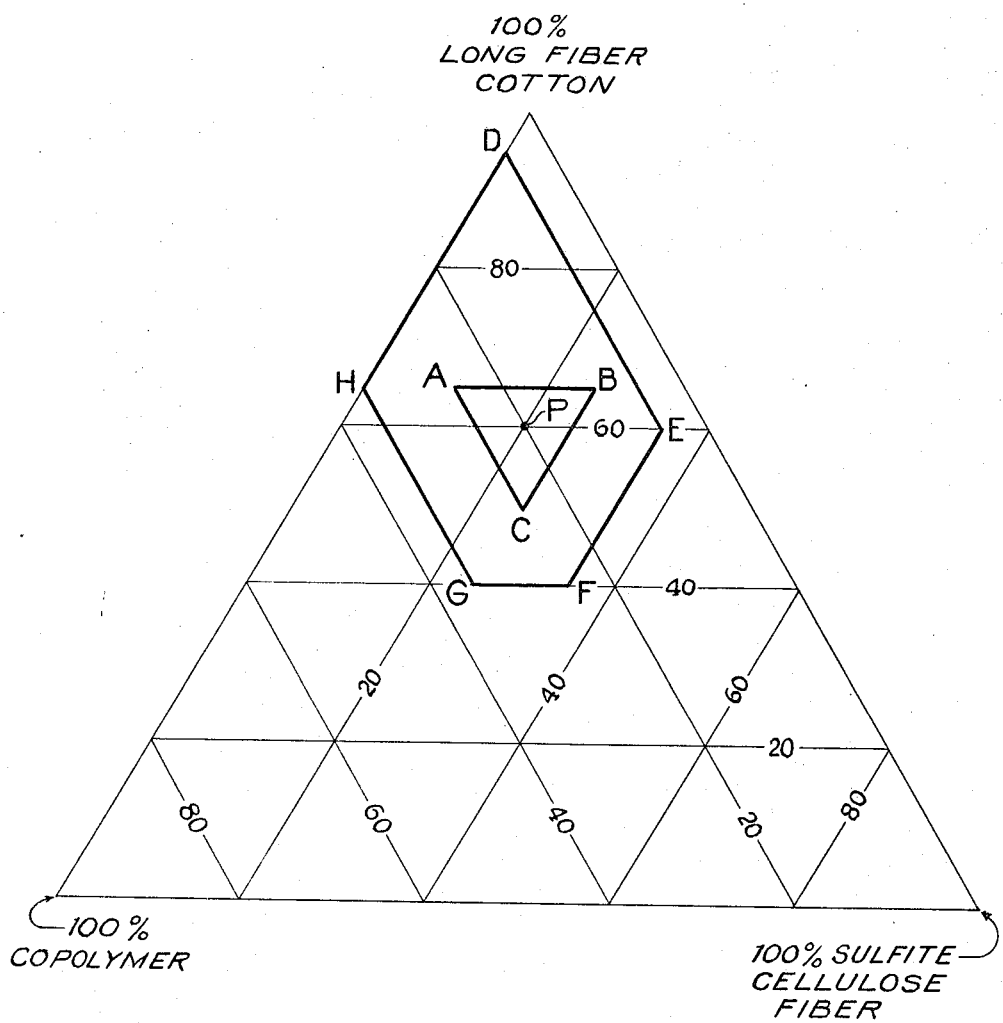

3,348,681
FILTRATION OF PERCHLORETHYLENE
AND FILTER FABRIC
Donald E. Wiegand, Minneapolis, Minn., assignor to Wood Conversion Company, St. Paul, Minn., a corporation of Delaware
Filed Feb. 10, 1964, Ser. No. 343,648
11 Claims. (Cl. 210—65)

This application is a continuation-in-part of Ser. No. 186,466, filed Apr. 10, 1962, now Patent No. 3,231,094, and also a continuation-in-part of Ser. No. 254,870, filed Jan. 30, 1963, now Patent No. 3,259,248.

The present invention relates to filtering perchlorethylene and to a filter fabric therefor.

The fabric is a non-woven fiber felt which may be made by any of the well-known methods, such as an air-laying process.

Perchlorethylene is used as a dry-cleaning liquid, especially in the coin-operated installations. In use, it carries away soil and dirt in suspension, which can be filtered out to produce a filtrate for reuse. Such coin-operated installations employed filter tanks for the purpose, and problems arise in connection with the filter material.

In use, any filter element, such as a layer of fabric, first functions to filter and then builds a filter cake thereon, which cake later participates in the filtering function, unless the cake cracks. As the cake builds up, it weights the fabric, and where the fabric is such as to be compressed, its porosity is lessened by the growing cake, thus retarding filtration.

According to the present invention, a filter fabric is provided which lessens these difficulties. The fabric is made of mixed fibers, predominating in cellulosic fibers, essentially including long fiber cotton and preferably being a mixture of long fiber cotton and short fibers derived from wood. However, the minor but important fibrous component is a thermoplastic fiber, particularly a copolymer of vinyl chloride and vinyl acetate, characterized by a melting point upwardly from 275° F., a low softening point in the range from 125° to 140° F., and a tacky point in the range from 185° to 215° F. These properties are not pertinent to functioning of the fabric in the present invention, but are given to define the copolymer and to designate the extent of copolymerization.

The filter fabric of the present invention is one designed for a limited extent of use, being economically suitable in cost so that it may be discarded when it is a part of a disposable filter cartridge. Hence, low-cost cellulosic fibers are a dominant component.

Cellulosic fibers are resistant to perchlorethylene, that is, they are not wetted so as to swell as they do with water. The copolymer fibers are slightly sensitive to perchlorethylene in that they tend to gel, not readily, but slightly, slowly and continuously. Tests have shown that as a filter fabric of the present invention is used time after time or continuously to filter a perchlorethylene solvent, the gelling of the fibers increases advantageously for the filtering function, compensating for the compressive effect on the fabric by the growing filter cake. The gelling of the copolymer fiber tends to increase the porosity of the fabric, while the growing filter cake tends to decrease the porosity. Also, the gelling increases the strength of the fabric while wet with perchlorethylene.

The fabric for the present invention is one of interlaced fibers preferably without a bonding agent. Fibers derived from wood are short and in a felt of only wood fibers, a bonding agent is required. Long fiber cotton is used to give dry and wet tensile strength to an unbonded fabric and to hold wood fibers when present. To supplement this action of long fiber cotton, the copolymer fibers are used in long lengths, especially so that in the ultimate gelled condition they provide relatively long internal ties in the fabric.

To give strength to the fabric so that it may retain its felted status in handling, as in building filter apparatus, and in performing in a filter, it is faced on at least one side, and sometimes on both sides, with open mesh fabric, such as cotton scrim. A low content of starch adhesive serves to hold the scrim to the felt.

The following compositions are suitable, specifically and generically.

| | Parts by Weight | | |
|---|---|---|---|
| | Preferred | Ranges | |
| | | Preferred | Extreme |
| Long fiber cotton | 60 | 50–65 | 40–95 |
| Sulfite wood fiber | 20 | 10–25 | 0–35 |
| Copolymer fiber (Denier 3, length 1½ inches) | 20 | 10–25 | 5–35 |

The above composition and ranges are set forth in the accompanying drawing in which the preferred composition P is centered in the triangle ABC representing the preferred range. The pentagonal area DEFGH represents an extreme range and includes compositions with no short fibers derived from wood.

The mixed fibers are preferably felted from a vehicular air stream directed into and through a filtering screen on which the felt is formed and removed, such as the apparatus disclosed by Duval in U.S. Patent No. 3,010,-161, which is particularly adapted for mixing the fibers in the air stream which conveys the mixture for deposition.

The felt so formed is very light with little dry strength. It is then wetted with water and pressed to give when dry a weight in the range of 25 to 50 lbs. per 1000 square feet without the scrim. The wet pressed fabric is combined with cotton scrim carrying a starch sizing. The water in the fabric wets the starch on the cotton scrim and on drying the combined layers the starch provides adhesion of the scrim to the fabric. It is mechanically more convenient to provide scrim only on one face of the fabric, rather than on two faces, and in order to provide a filter leaf with scrim on both faces thereof, two layers of fabric each having scrim on one face are placed together with the scrim on the outsides.

As commonly used, disks or other shaped leaves of the fabric are built into a filter structure, such that perchlorethylene is forced under pressure through the fabric, leaving its suspended matter on the scrim-covered face. The scrim helps to support the growing cake where the fabric has an unsupported span. As the weight of the cake tends to compress the fabric, the growing swelling with gellation of the copolymer compensates in retaining a suitable porosity, thus prolonging the life of the fabric until sufficiently loaded with cake to warrant discard of a replaceable filter structure.

A suitable use of the fabric is shown and described in my said earlier application Ser. No. 186,466, filed Apr. 10, 1962.

I claim:
1. The method which comprises filtering perchlorethylene through a sheet of felted fiber containing cellulosic fibers and thermoplastic fibers of copolymer of vinyl chloride-vinyl acetate.
2. The method which comprises filtering perchlorethylene through a sheet of felted fiber containing long fiber cotton, fibers derived from wood and thermoplastic fibers of copolymer of vinyl chloride-vinyl acetate.
3. The method of claim 1 in which the cellulosic fibers include sulfite wood fibers.

4. The method of claim 1 in which the cellulosic fibers predominate.

5. The method which comprises filtering perchlorethylene through a sheet of loosely felted unbonded fibers comprising essentially by weight 80 parts of cellulosic fibers of which at least 60 parts are long fiber cotton, and 20 parts of copolymer of vinyl chloride-vinyl acetate fibers, said copolymer being softened by the perchlorethylene to improve the initial filtering ability of the mat.

6. A filter sheet comprising loosely felted fibers including essentially by weight 80 parts of cellulosic fibers of which at least 60 parts are long fiber cotton, and 20 parts of synthetic fibers of copolymer of vinyl chloride-vinyl acetate, said filter having a fiber density of 25 to 50 pounds per 1,000 square feet.

7. A filter sheet according to claim 6 having by weight 60 parts of long fiber cotton and 20 parts of fibers derived from wood.

8. A filter sheet comprising loosely felted fibers including essentially by weight cellulosic fibers selected from the group consisting of long fiber cotton and fiber derived from wood, and synthetic fibers of copolymer of vinyl chloride-vinyl acetate, said fibers being present in the relative proportions represented by the area ABC in the drawing, and said sheet having a fiber density of 25 to 50 pounds per 1,000 square feet.

9. A filter sheet comprising loosely felted fibers including essentially by weight cellulosic fibers selected from the group consisting of long fiber cotton and fibers derived from wood, and synthetic fibers of copolymer of vinyl chloride-vinyl acetate, said fibers being present in the relative proportions represented by the area DEFGH in the drawing, and said sheet having a fiber density of 25 to 50 pounds per 1,000 square feet.

10. A filter sheet comprising an open fiber felt consisting essentially of copolymer of vinyl chloride-vinyl acetate, and cellulosic fibers.

11. An unbonded filter sheet comprising an open fiber felt consisting essentially of copolymer of vinyl chloride-vinyl acetate, and cellulosic fibers.

References Cited
UNITED STATES PATENTS

| | | | |
|---|---|---|---|
| 2,083,546 | 6/1937 | Aldham | 210—484 |
| 2,834,730 | 5/1958 | Painter et al. | 210—491 X |
| 2,886,178 | 5/1959 | Davis et al. | 210—167 X |
| 3,003,643 | 10/1961 | Thomas | 210—508 X |
| 3,062,379 | 11/1962 | Bryan | 210—499 |
| 3,132,501 | 5/1964 | Jacobs et al. | 210—335 X |

REUBEN FRIEDMAN, *Primary Examiner.*

J. DE CESARE, *Assistant Examiner.*